No. 631,247. Patented Aug. 15, 1899.
F. R. BIGNOLD.
COMBINATION IMPLEMENT.
(Application filed Nov. 7, 1898.)
(No Model.) 4 Sheets—Sheet 2.
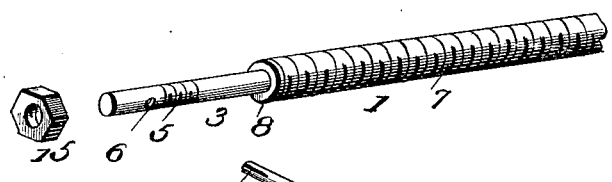
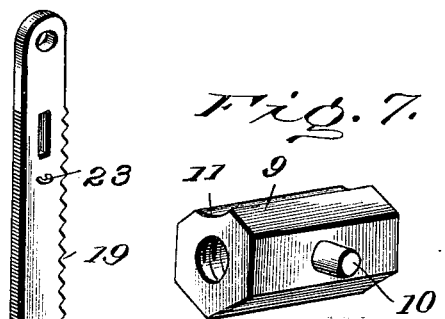
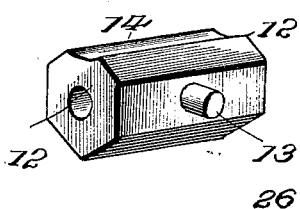
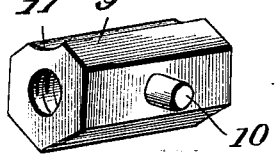
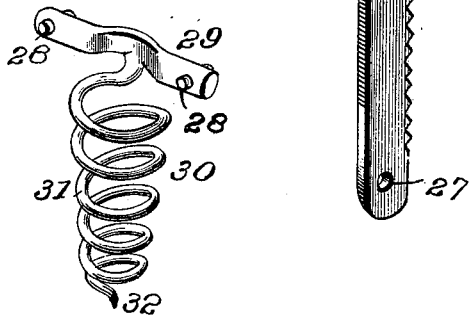
Inventor
Frederick R. Bignold No. 631,247. Patented Aug. 15, 1899.
F. R. BIGNOLD.
COMBINATION IMPLEMENT.
(Application filed Nov. 7, 1898.)

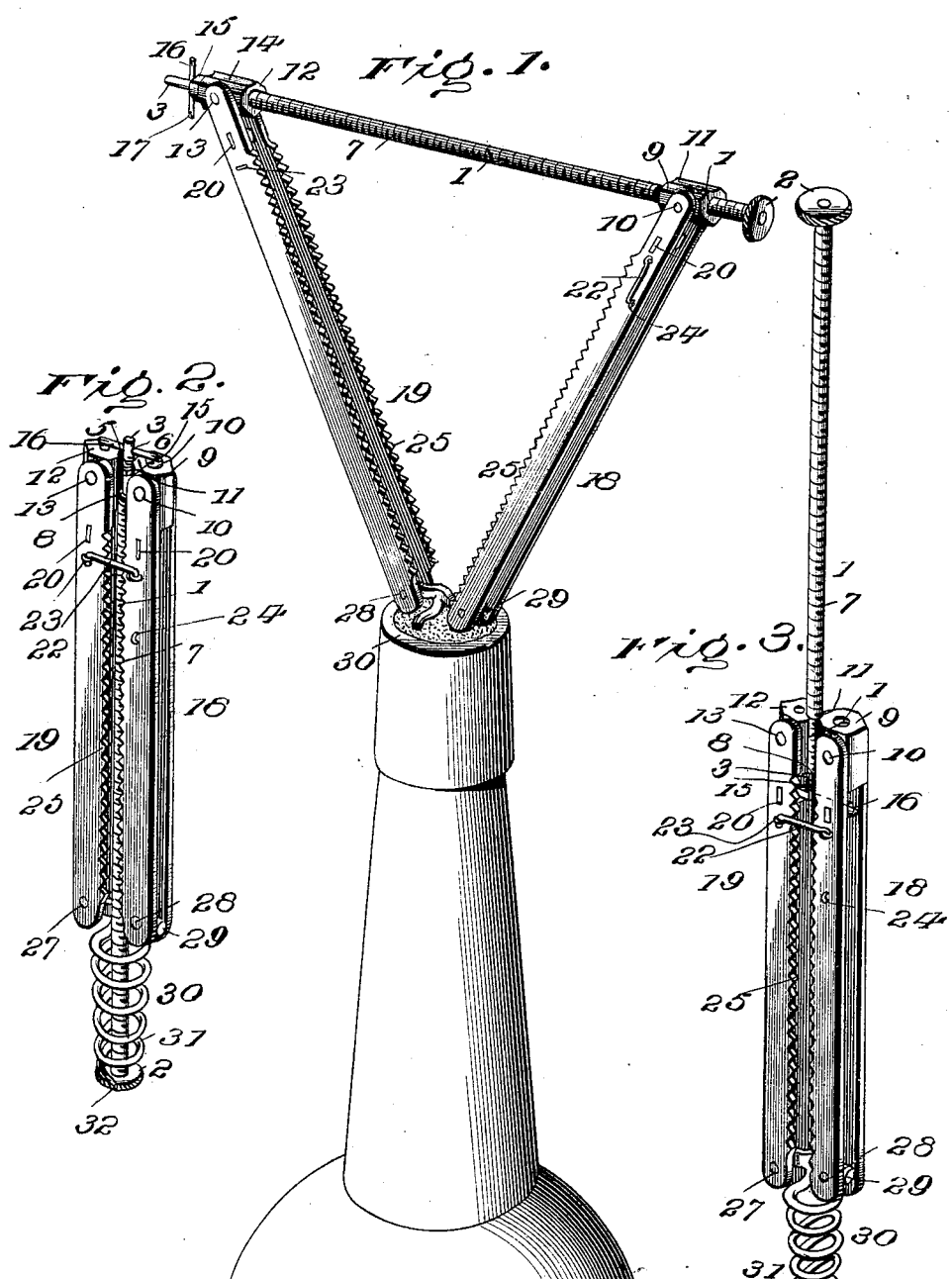

(No Model.) 4 Sheets—Sheet 3.

Witnesses
Jno. [illegible]
Gladys L. Thompson

Inventor
Frederick R. Bignold
by R. S. & A. B. Lacey his Attorneys

THE NORRIS PETERS CO., PHOTO-LITHO., WASHINGTON, D. C.

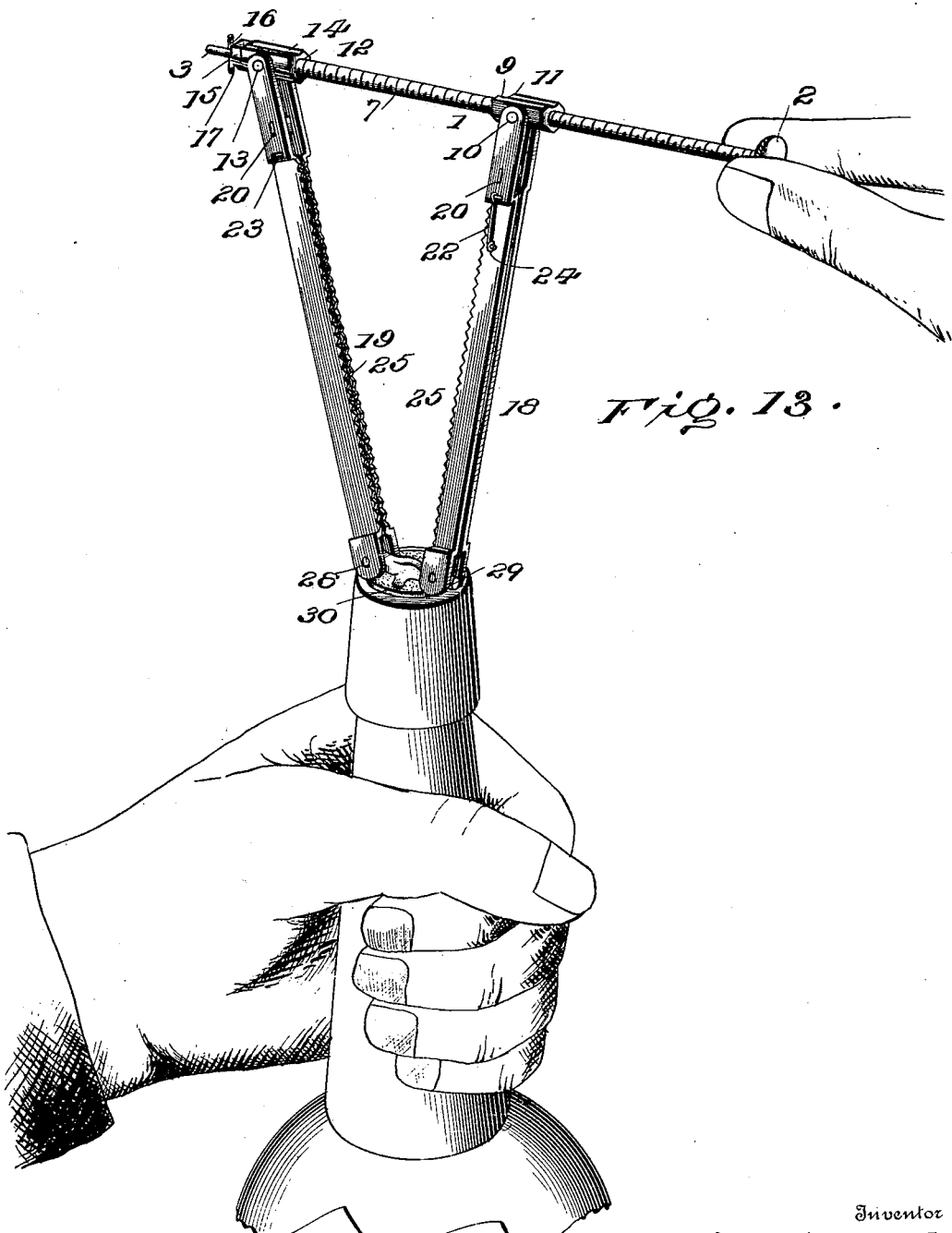

UNITED STATES PATENT OFFICE.

FREDERICK R. BIGNOLD, OF EWING, NEBRASKA.

COMBINATION IMPLEMENT.

SPECIFICATION forming part of Letters Patent No. 631,247, dated August 15, 1899.

Application filed November 7, 1898. Serial No. 695,726. (No model.)

*To all whom it may concern:*

Be it known that I, FREDERICK R. BIGNOLD, a citizen of the United States, residing at Ewing, in the county of Holt and State of Nebraska, have invented certain new and useful Improvements in a Combination Implement; and I do hereby declare the following to be a full, clear, and exact description of the invention, such as will enable others skilled in the art to which it appertains to make and use the same.

This invention relates to combination implements, including, specially, a corkscrew of the screw-operated-lever class and adapted also for use as a clamp, wrench, nut-cracker, lamp-chimney cleaner, pickle-fork, greaser, torch, nail-file, cartridge-extractor, &c.; and the purpose of the same is to combine in a single device structural features capable of the various uses mentioned and reduce the dimensions of the several parts to such an extent as to render them compact when folded and without detracting in the least from their durability and effectiveness.

The invention consists of the construction and arrangement of the several parts more fully hereinafter described and claimed.

Figure 9:
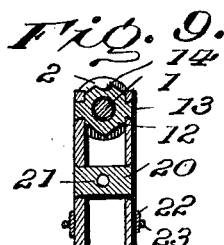
Figure 10:
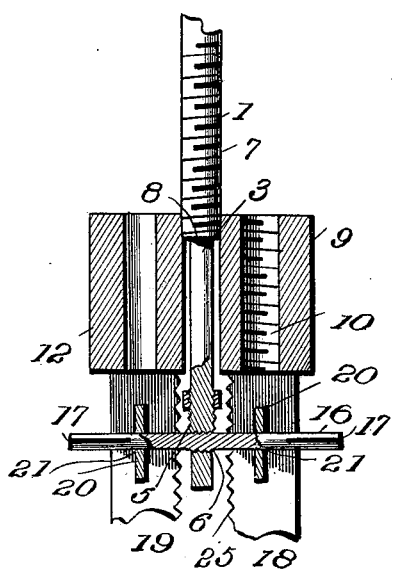
Figure 11:
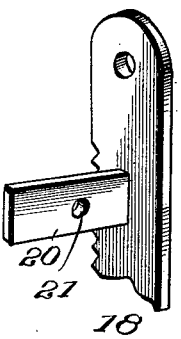
Figure 12:
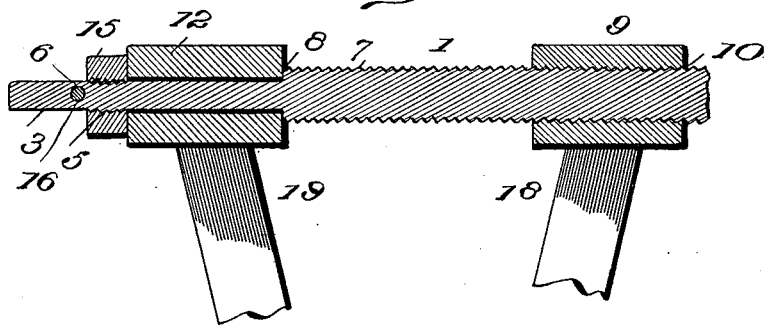

In the accompanying drawings, Figure 1 is a perspective view of a bottle, showing the improved implement applied thereto and in use as a corkscrew and illustrating the operation carried on in drawing a cork from a bottle-neck. Fig. 2 is a similar view of the implement shown folded. Fig. 3 is a similar view of the device, showing it arranged for use as a pickle-fork, greaser, lamp-chimney cleaner, or torch. Fig. 4 is a detail perspective view of the operating-screw and parts used therewith. Fig. 5 is a detail perspective view of one of the levers. Figs. 6 and 7 are detail views of two sleeves which are mounted on the operating-screw. Fig. 8 is a detail view of the corkscrew attachment. Fig. 9 is a transverse section of one of the pairs of levers, taken longitudinally thereof. Fig. 10 is a detail sectional elevation of a part of the device shown folded. Fig. 11 is a detail perspective view of a part of one of the bars and a connecting-plate. Fig. 12 is a detail sectional elevation through the screw-rod and sleeves. Fig. 13 is a perspective view of the improved device, showing the manner of operating the same, and a slight modification.

Referring to the drawings, wherein similar numerals of reference are employed to indicate corresponding parts in the several views, the numeral 1 designates an elongated screw-rod having on one end a head 2 with a milled edge for convenience in gripping the same. The opposite end of the said rod is reduced, as at 3, for a suitable length, and, as clearly shown by Fig. 4, is provided with intermediate screw-threads 5 and an outer threaded opening 6, the latter extending transversely therethrough near the outer free end. The said rod 1, from the head 2 to the reduced end 3, is screw-threaded, as at 7, and where the reduced portion begins a shoulder 8 is formed. On the screw-threaded part of the said rod 1 a sleeve 9 is adjustably fitted, and, as shown by Fig. 7, is interiorly screw-threaded and has studs 10 diametrically projecting from opposite portions thereof. This sleeve 9 can be made cylindrical, polygonal, square, or of any other form, and has a concave 11 extending longitudinally thereof, for a purpose which will be presently set forth. On the reduced end 3 of the said rod a second sleeve 12 is loosely mounted, and, as shown by Fig. 6, has an internal smooth bore sufficiently large to permit it to be easily mounted on the said end 3, and, like the sleeve 9, has studs 13 diametrically projecting from opposite portions thereof, and also a longitudinal concave 14. The shape of the sleeve 12 may also be varied as desired, and when it is in operative position, when the device is arranged as a corkscrew, the inner end thereof abuts against the shoulder 8 of the rod, the screw-threads 5 on the reduced end 3 of the said rod having a securing-nut 15 applied thereto, which holds the said sleeve 12 to its seat. Space enough is allowed between the shoulder 8 and the nut 15 to permit the said sleeve to have free rotative movement on the end 3, and after the nut 15 is placed on the end 3, as set forth, the tapped opening 6 is engaged by a transversely-extending pin 16, having intermediate screw-threads thereon, as shown by Fig. 4, and opposite split ends 17. This pin, when the device is arranged as a corkscrew, serves as a stop to prevent the nut 15 from running off the end 3 in the event that said nut becomes loose from the movement of the parts adjacent thereto. The said pin 16 also has other functions, which will be hereinafter referred to.

Connected to the studs 10 and 13 of the sleeves 9 and 12 are the upper ends of opposite pairs of levers 18 and 19, the said upper ends of the levers having openings therein to receive the said studs, and after the latter are inserted in said openings they are headed or upset, so as to form a firm connection, but at the same time allow said levers to have a swinging or hinge movement thereon. The opposite pairs of levers 18 and 19 move together, particularly when the device is arranged as a corkscrew, as shown in Fig. 1, and below their point of attachment, so as not to interfere with or touch the rod 1. Each pair of said levers is connected by a transverse plate 20, having a central aperture 21 therein, and when said pairs are drawn closely together in folded condition, as shown by Figs. 2 and 5, the apertures 20 in the said plates stand in alinement. At a suitable distance below the said transverse plates 20 hooks 22 and eyes 23 are carried by the said levers on opposite sides—that is, the hook is pivotally attached to the outer portion of one lever of each pair and engages an eye on the opposite lever of the other pair—and when said hooks are used they hold the said levers closely together. As shown by Fig. 5 and in the arrangement of the device as a corkscrew, to prevent the said hooks from swinging backward and forward or hanging loosely a stay-eye 24 is mounted on each lever, carrying the hook adjacent to the latter. The outer surface of the levers can be suitably ornamented, and at their inner opposing edges teeth 25 of a suitable dimension and pitch are formed, and on one of the outer edges, as shown by Fig. 5, a nail-file 26 may be formed and also applied to each of said levers or only one of the same, as may be desired. The lower ends of the opposite pairs of levers 18 and 19 are also formed with apertures 27 and receive oppositely-projecting studs 28, located near each end of a T-head 29, forming part of a corkscrew 30. The studs 28 are upset similarly to the studs 10 and 13, heretofore described, and so that the said levers will have a hinged connection or sufficient movement to be drawn together or forced outwardly from each other. The corkscrew 30 has the customary spiral 31 and a lower extended sharpened end 32, and it is preferable that the shank running up from the spiral 31, supporting the head 29, stand a little to one side of the center of said spiral in order that the arrangement of the parts, as will be hereinafter set forth, may be accommodated.

In the use of the device as a corkscrew the levers 18 and 19 are arranged as shown in Fig. 1 and so that the sleeve 9 will be located apart from the sleeve 12, the distance between said sleeves being determined by the force presumed to be necessary to draw the cork. When the parts are thus arranged, the rod 1 is grasped with the right hand, the point 32 of the spiral 31 inserted in the cork to be drawn, and the entire implement is then revolved to embed the said spiral in the cork. When a sufficient penetration of the spiral has been obtained, the neck of the bottle is grasped with the left hand and the screw-rod 1 is revolved through the medium of the milled head 2, which is turned by the thumb and forefinger of the right hand. The sleeve 12 of course remains stationary as regards a longitudinal movement on the said rod 1; but the sleeve 9 gradually draws nearer to the sleeve 12 and a starting force is exerted on the cork, it being understood that the head 2 will be turned in the proper direction to attain the movement of the sleeve 9 set forth. The pairs of levers are first separated and the corkscrew inserted in the cork, as clearly shown by Fig. 1, and in this position the lower ends of the levers rest on a part of the upper end of the cork. The sleeve 9 is then moved toward the sleeve 12 until the lower ends of the levers gradually move outward or swing on their pivots and assume the position shown by Fig. 13. During this operation the bottle is firmly held down by grasping the neck thereof, as in Fig. 13, and a pulling effort is exerted on the cork as soon as the lever ends bear upon the upper edge of the bottle-neck at diametrically opposite points. This pulling effort is not exceptionally strong; but by its gradual application the cork is slightly loosened from its initial securement, and thereby facilitates the after full withdrawal by grasping the screw-rod 7 and pulling thereon, as in the use of an ordinary corkscrew. This operation is very simple and can be successfully carried on with a very small amount of applied power, and though the cork may not at all times be entirely withdrawn from the neck of the bottle it will be sufficiently forced out as to be afterward easily removed with the fingers or pulled out by the implement itself.

In Fig. 3 the device is shown as having the levers 18 and 19 closely drawn together and the screw-rod 1 as projected from one end. In arranging the parts in this manner the pin 16 is released from the reduced end 3 and the nut 15 run off said end. The screw-rod 1 is then turned in proper direction to disengage itself from the sleeve 9, and the two sleeves are then swung around to occupy vertical positions between the levers, and the latter are drawn closely together. The concaves 11 and 14 of the said sleeves will then stand inwardly toward each other and fit around opposite portions of the part of the said rod 1 which is placed between them. Before the said rod is placed between the sleeves the nut 15 is again run on the threads 5 of the end 3, and the diametrical extent of said nut is such as not to project beyond the said rod 1.

When the rod 1 is placed between the upper ends of the levers, as shown by Fig. 5, the tapped opening 6 of the reduced end 3 stands in line with the apertures 21 of the plate 20, and the pin 16 is then inserted through the aperture of one of the plates, screwed into said opening 6, and passed out through the opposite plate, thus forming a connection for the said rod 1. The levers are then held in closed position by the hooks 22 engaging the eyes 23, and in this arrangement various uses can be made of the implement. It can be used as a pickle-fork and inserted in the neck of a pickle bottle or jar to withdraw the contents therefrom and is especially useful in removing pickled onions or other vegetables which are liable to swell after pickling and become lodged in the neck or mouth of the bottle or jar. In this use it will be seen that a drawing action can be instituted on such vegetables, or even on certain kinds of fruits. In this same arrangement the extended pointed end 32 of the spiral 31 can be employed for canceling stamps on cigar-boxes or other devices by scratching the same or otherwise mutilating them. In this same arrangement, also, a greasing-cloth can be attached to the corkscrew-spiral and the device conveniently employed for greasing griddles and other cooking utensils. A further use in this form is to apply a sponge or quantity of waste material to the spiral of the corkscrew and use the device for cleaning lamp-chimneys. A still further use of the implement in the form shown by Fig. 5 is to apply cotton-batting or analogous material to the corkscrew-spiral and saturate the same with alcohol and ignite it for purposes of forming a torch to conveniently singe fowls preparatory to cooking the same.

As a small wrench suitable for bicycles, sewing-machines, and the like the device is arranged as shown in Fig. 1, and the upper levers while open or spread apart from each other are placed around the nut and the head 2 operated to move the sleeve 9 toward the sleeve 12 and cause the levers 18 and 19 to be drawn toward each other around the nut, which will be held firmly by the teeth 25. The device is then revolved, and the nut may be run on or off its bolt, as desired. The same operation will ensue in making a clamp of the device, and the article to be clamped is held between the levers 18 and 19. A nut-cracker is also formed by placing the nut between the levers and the latter drawn together against the nut, which will be crushed by the pressure exerted thereon. As a shell-extractor for guns the levers are brought to bear firmly on the rim of the cartridge, and after a firm engagement is attained the shell or cartridge may be withdrawn.

In Fig. 13 the position of the parts in starting to remove the cork is shown and the arrangement of the hands of the operator, as heretofore specified. The levers are also formed in this instance with inward bends to adapt the device for more successful use in performing certain operations.

When the device is folded, as shown by Fig. 2, it is intended for storage or to be carried in the pocket. In this instance the screw-rod 1 is reversed by being pushed up through the coil 31 of the corkscrew and between the levers and the reduced end lying intermediate of the sleeves 9 and 12 and held by the pin 16 to the plates 20. The hooks and eyes 22 and 23 are also connected, and the levers are retained thereby in closed position, and also the head 2 shields the point 32 of the coil 31.

Changes in the proportions, dimensions, and minor details of construction can be resorted to without in the least departing from the nature or spirit of the invention.

Having thus described the invention, what is claimed as new is—

1. In an implement of the character specified, the combination of a screw-rod, pairs of levers operatively connected at their upper ends to said rod, and a corkscrew attached to the lower ends of said levers, and preventing the latter from separating.

2. In an implement of the character specified, the combination of a screw-rod, sleeves mounted on said rod, one of which is longitudinally movable, levers having their upper ends pivoted to said sleeves, and a corkscrew attached to the lower ends of said levers, and preventing the latter from separating.

3. In an implement of the character specified, the combination of pairs of levers, a screw-rod rotatively and removably attached to ends of said levers, and a corkscrew pivotally connected to opposite ends of said levers, and preventing the latter from separating.

4. In an implement of the character specified, the combination of a screw-rod, sleeves mounted on said screw-rod, one of which is adjustable longitudinally and both having longitudinal concaves therein, levers pivotally connected to said sleeves, and a corkscrew pivotally attached to opposite ends of said levers.

5. In an implement of the character specified, the combination of a screw-rod having a reduced end with a tapped opening extending transversely therethrough and intermediate screw-threads, sleeves mounted on said screw-rod, one of which is longitudinally adjustable and the other held on the reduced portion of the rod, a nut engaging the intermediate screw-threads on the reduced portion of the rod, a pin having screw-threads thereon and insertible in the tapped opening on the reduced end of the screw-rod, opposite pairs of levers pivotally connected to the said sleeves and having transverse plates with apertures therein, and a corkscrew pivotally attached to opposite ends of said levers.

6. In an implement of the character specified, the combination of a screw-rod having sleeves movably and adjustably mounted thereon, levers having their upper ends pivotally attached to said sleeves and provided with inner toothed edges, and a connection at the opposite ends of said levers.

7. In an implement of the character specified, the combination of opposite levers, a corkscrew to which ends of said levers are pivotally attached, sleeves pivotally mounted on the opposite ends of said levers, transverse plates connecting the opposite levers and having apertures therein, a screw-rod adapted to be engaged by said sleeves and having a reduced end with a tapped opening therethrough, and a pin having screw-threads thereon and adapted to be inserted in the apertures on the said transverse plates and the said tapped opening of the reduced portion of the screw-rod.

In testimony whereof I affix my signature in presence of two witnesses.

FREDERICK R. BIGNOLD.

Witnesses:
   D. G. ROLL,
   J. L. ROLL.